United States Patent [19]

Hirata et al.

[11] Patent Number: 4,995,739
[45] Date of Patent: Feb. 26, 1991

[54] TEXT EDITING DEVICE FOR ERASING HYPHENATED WORDS LOCATED ON TWO LINES

[75] Inventors: Keiichi Hirata, Kuwana; Yasushi Kawakami, Nagoya; Tomoko Miura, Nagoya; Miyako Mukai, Nagoya; Tomohiro Ban, Iwakura; Akihiro Furukawa, Nagoya, all of Japan

[73] Assignee: Brother Kogyo Kabushiki Kaisha, Nagoya, Japan

[21] Appl. No.: 323,971

[22] Filed: Mar. 15, 1989

[30] Foreign Application Priority Data

Mar. 16, 1988 [JP] Japan .................................. 63-62806

[51] Int. Cl.⁵ ................................................ B41J 5/30
[52] U.S. Cl. ...................................... 400/63; 400/695
[58] Field of Search ............. 400/7, 63, 74, 695–697.1

[56] References Cited

U.S. PATENT DOCUMENTS

| | | |
|---|---|---|
| 3,780,846 | 12/1973 | Kolpek . |
| 4,354,765 | 10/1982 | Buchanan ............................. 400/63 |
| 4,561,793 | 12/1985 | Blanchard . |
| 4,574,363 | 3/1986 | Carlgren ................................. 400/7 |
| 4,678,351 | 7/1987 | Curley ..................................... 400/7 |
| 4,786,894 | 11/1988 | Furusawa ............................. 400/63 |
| 4,820,063 | 4/1989 | Mori ..................................... 400/697 |
| 4,823,288 | 4/1989 | Ueno ..................................... 400/7 |
| 4,834,566 | 5/1989 | Mori ..................................... 400/695 |
| 4,842,428 | 6/1989 | Suzuki ................................... 400/63 |
| 4,847,766 | 7/1989 | McRae .................................. 400/63 |

FOREIGN PATENT DOCUMENTS

| | | |
|---|---|---|
| 256633 | 2/1988 | European Pat. Off. ........... 400/695 |
| 53-27054 | 8/1978 | Japan . |
| 60-210482 | 10/1985 | Japan . |

Primary Examiner—David A. Wiecking
Assistant Examiner—Steven S. Kelley
Attorney, Agent, or Firm—Kane, Dalsimer, Sullivan, Kurucz, Levy, Eisele and Richard

[57] ABSTRACT

In a text editing device, provided is an improved so-called wordout function, a word lying across two lines can be erased at one time with a single key operation. In case that a hyphen is located at the end of the line, it is determined that two divided parts of a single word are located on two lines.

By detecting a hyphen between two character strings, these two strings are erased at one time as two parts included in a single word.

19 Claims, 8 Drawing Sheets

FIG. 3

START OF THE LINE        END OF THE LINE the perfect document△every-
time and the

START OF THE LINE the perfect document every-time and the

END OF THE LINE

FIG. 4B

RT OF THE LINE the perfect document △ every time and the

END OF THE LINE

FIG. 4C

START OF THE LINE the perfect document every-
time and the

END OF THE LINE

FIG. 4D

START OF THE LINE the perfect document every—
time and the
Δ

END OF THE LINE

FIG. 5

TEXT EDITING DEVICE FOR ERASING HYPHENATED WORDS LOCATED ON TWO LINES

BACKGROUND OF THE INVENTION

This invention relates to a text editing device having a function for erasing a character string with a single key operation, so-called "wordout" function, and more particularly to a text editing device capable of erasing a character string successively located on two lines with a single key operation.

There has been known a text editing device with a wordout function in which character data is stored in a memory and a character string composed of the character data, for instance a word, can be erased by pressing a certain key provided on a keyboard.

A text editing device having such function presents no problem in case that the word to be erased remains in one line. If the word lies across two lines, however, with a hyphen connecting the part of the word on the preceding line and that on the succeeding line, although the part of the word on the line on which the cursor or carriage is placed, e.g., the part placed on the succeeding line without hyphen, can be erased with a single key operation, the part prior to the hyphen, which exists on the preceding line including the hyphen, remains unerased with this key operation. The problem is, therefore, encountered that the character string, though it actually form one word, cannot be erased with a single key operation.

SUMMARY OF THE INVENTION

It is therefore an object of the invention to provide an improved text editing device capable of erasing a character string which is located across two lines with a single key operation.

For this purpose, according to this invention, there is provided a text editing device comprising input means for inputting character codes and function codes, memory means for storing the codes, represent means for representing characters corresponding to the codes inputted by said input means, designate means for designating a point of text line which consists of a plurality of character strings, said text editing device further comprising:

erase means for erasing characters successively located behind the point designated by said designate means;

eliminate means for eliminating the character codes corresponding to the characters erased by said erase means;

erase control means for further erasing successive characters located on a successive line, in case that a predetermined character is located at the end of the line and just behind the character erased by said erase means; and eliminate control means for eliminating the character codes corresponding to the characters erased by said erase control means and a line feed code being stored with the character codes.

DESCRIPTION OF THE EMBODIMENTS

Figure 1:
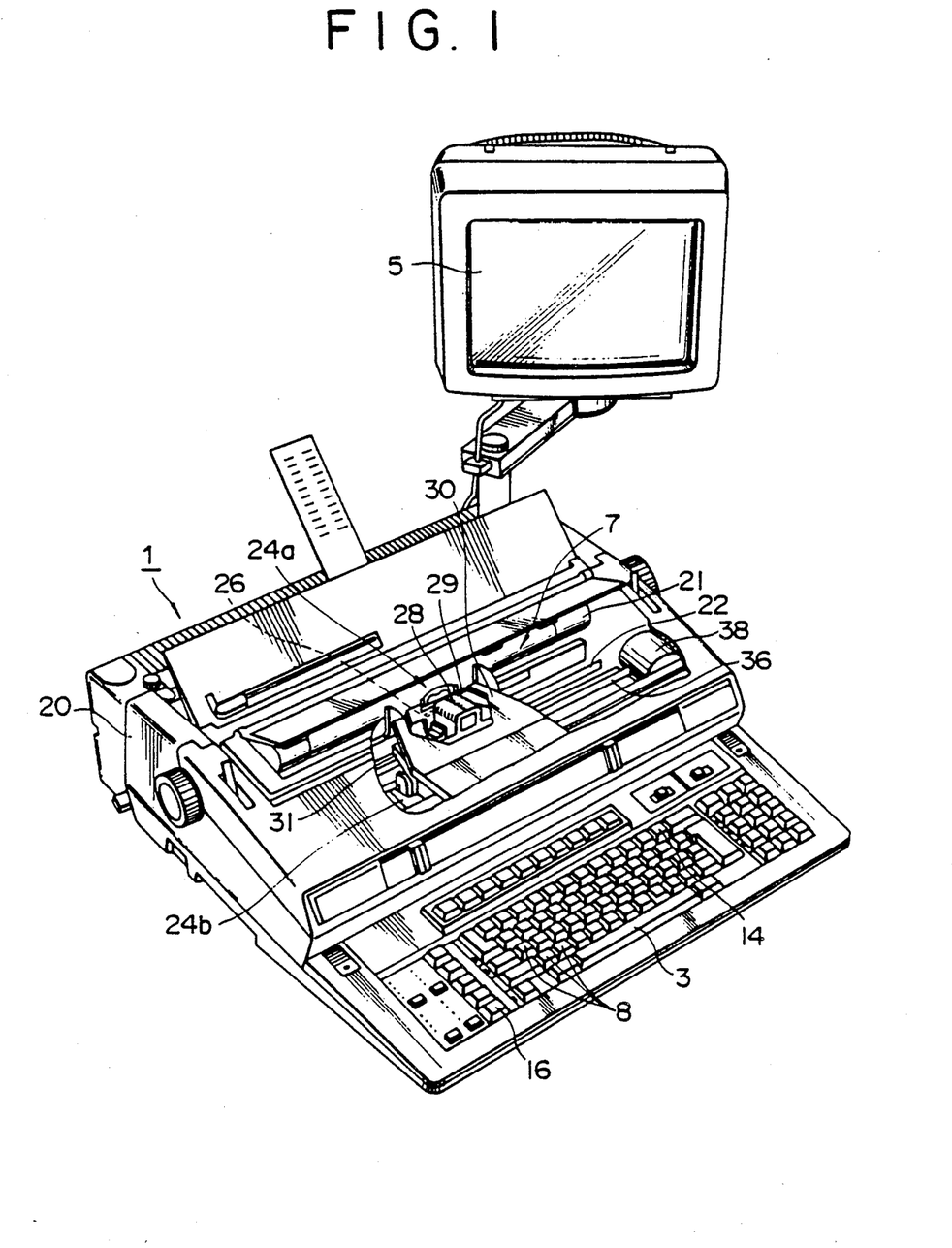
FIG. 1 is a perspective view of the text editing device embodying the present invention.

FIG. 1 shows a text editing device embodying the invention, which is provided with a keyboard 3 with a plurality of keys, a display unit 5 for displaying characters, and a printer 7 for printing characters. The keyboard 3 consists of character keys 8 for inputting alphanumerical character codes and symbols, a space key 12 for moving a carriage by one digit to the right, a hyphen key 14 for inserting a hyphen data interconnecting character strings, a wordout key 16 for deleting a character string one displayed, and other function keys.

The display unit 5 indicates the text data inputted through the keyboard 3 and messages for an operator sent from the text editing device 1.

The printer 7 is provided with a platen 21 rotatably carried by a main unit 20 to retain a piece of print paper, not shown, a pair of guide bars 22 provided in parallel with the platen 21, and the carriage 10 mounted to move along the pair of guide bars 22. The carriage 10 has mounted thereon a print assembly 24a for printing characters on the print paper. The print assembly 24a consists of a disc type print wheel 26, a ribbon cassette 30 accommodating a print ribbon 29 and an erasure assembly 24b for deleting characters printed on the print paper using an erasure ribbon 31. Engaged with the carriage 10 is a timing belt 36 which is wound around a drive pulley, not shown, mounted on the frame.

Figure 2:
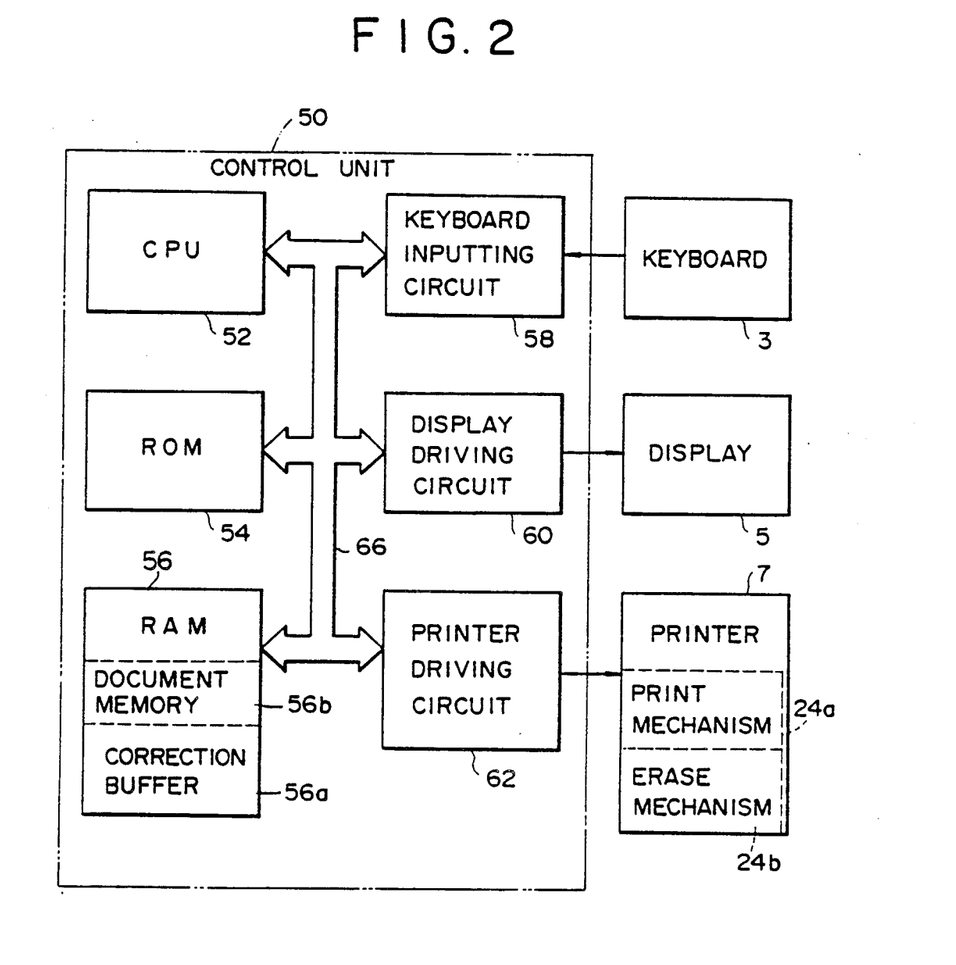
FIG. 2 is a structural view showing an electronic control system and its peripheral units of the text editing device of FIG. 1.

The keyboard 3, the display unit 5 and the printer 7 are all connected with an electronic control system 50 incorporated in the main unit 20. As shown in FIG. 2, the electronic control system 50 is consistuted by a known CPU (Central Processing Unit) 52, a control ROM (Read Only Memory) 54 with control programs and data stored in advance, a read and write RAM (Random Access Memory) 56, a keyboard inputting circuit 58, a display driving circuit 60, a printer driving circuit 62, and other circuits connected together via a common bus 66. The CPU 52 tentatively reads or writes data required for the RAM 56 in accordance with the programs stored in the control ROM 54, while executing subsequent input and output processings.

In particular, in a text edit mode, the characters and other necessary information inputted through the keyboard 3 are shown on the display unit 5 by way of the display driving circuit 60. In a type mode, on the other hand, the characters inputted through the keyboard 3 are printed by driving the printer 7 by means of the printer driving circuit 62.

The RAM 56 contains a correction buffer 56a, in the type mode, the characters inputted through the keyboard 3 are stored in the buffer 56a together with the display position so that at least two lines of character data can be stored in it. The RAM 56 is also provided with a text memory 56b that stores, in the edit mode, the characters inputted through the keyboard 3 together with their display position data so as to store text data therein.

Figure 3:
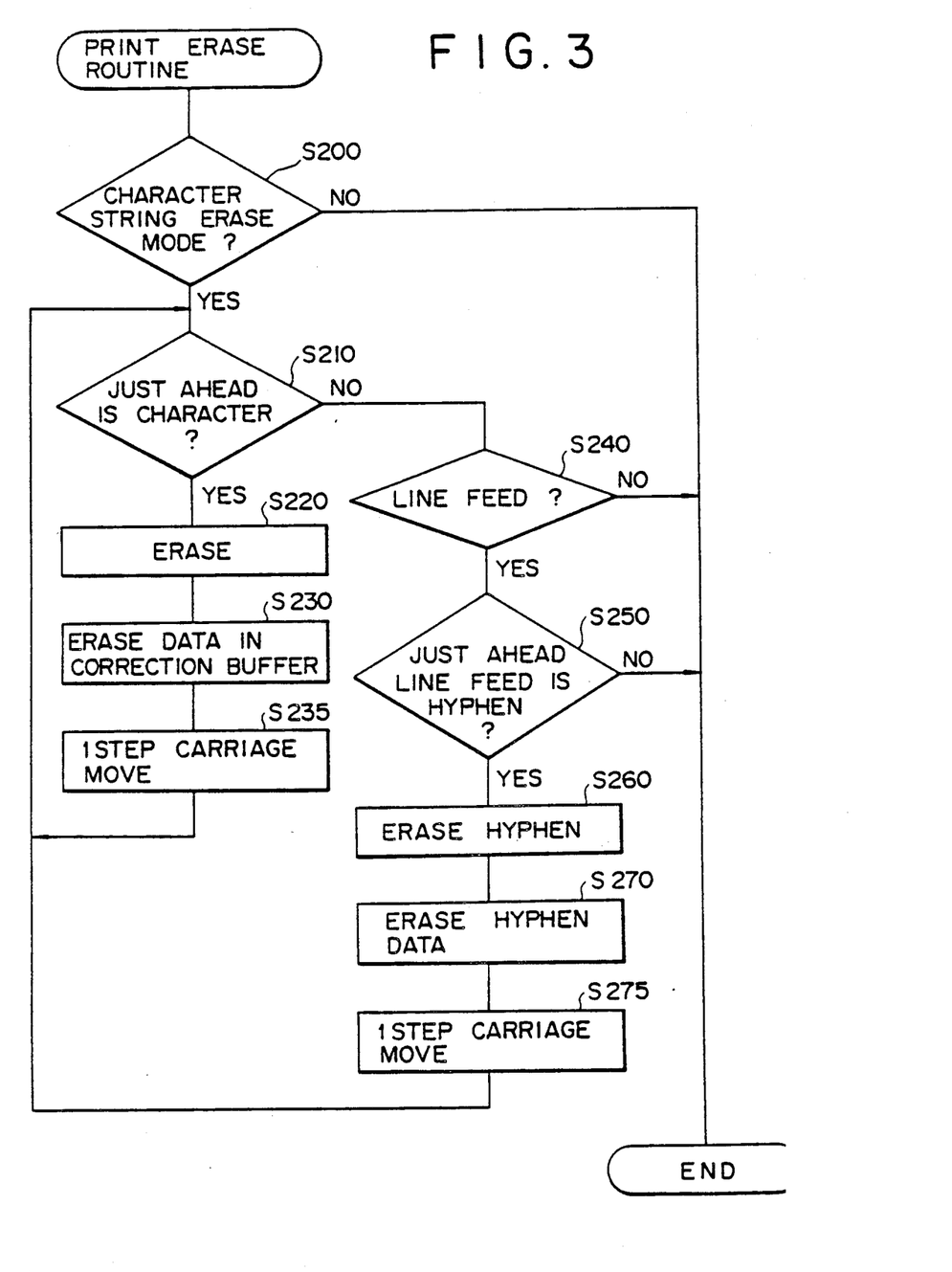
FIG. 3 is a flow chart showing one example of control routines taking place in the electronic control system.

The wordout processing for erasing at one time the word printed in the type mode, which is to be executed in the electronic control system 50 mentioned above, is now described with reference to the flow chart of FIG. 3.

Figure 4A:
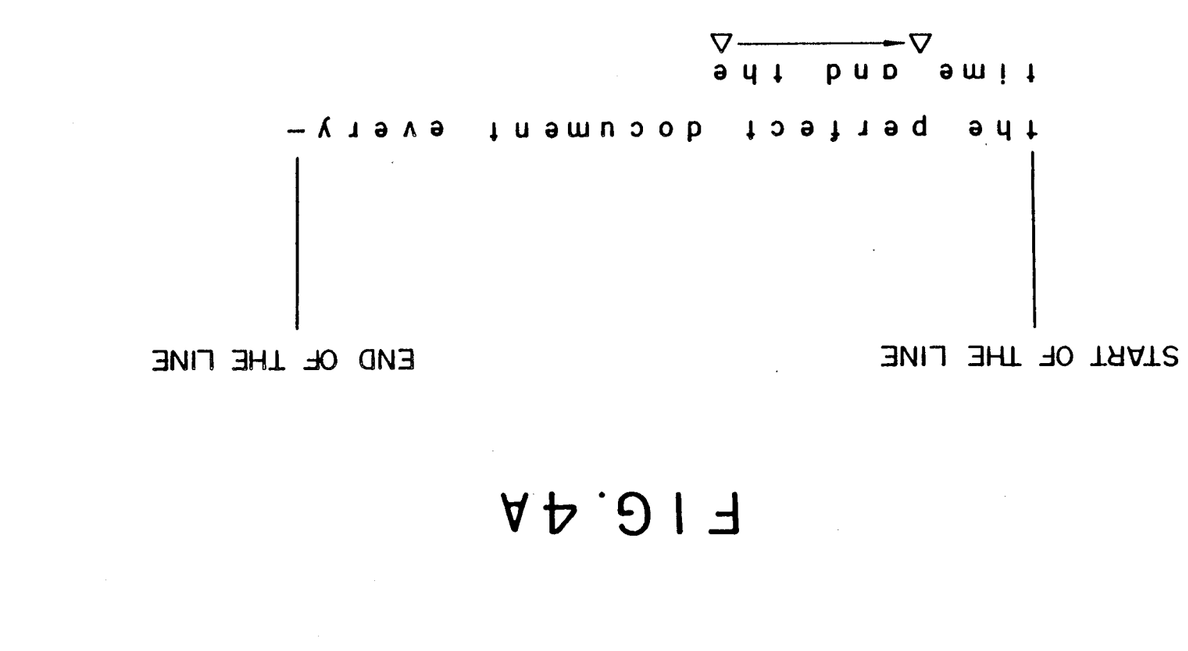
FIGS. 4A through 4D are illustrative views showing erasure of a word.

Assume at first that the word printed on the print paper across two lines is to be erased, the carriage 10 is moved to the position next to the word to be erased. If, the word "every-time", for instance, is to be erased as shown in FIG. 4A, the carriage 10 is moved to the space following the character "e" ("e" for "time"), ad the wordout key 16 is then pressed. If the key input through the keyboard 3 is found to be the wordout key 16, the editing device, is determined to be in the character string erase mode (Step S200; Step S200 is referred to simply as S200 in the succeeding description; the same applies to all other steps). It is then examined whether or not the data stored in the correction buffer 56a, which corresponds to the locational data just ahead the location where the carriage 10 stops, is a character code (S210). If it is determined to be a character, the carriage 10 is moved to the left by one digit whereupon the erasure assembly 24b causes the print hammer 28 to hammer the type corresponding to the character data stored in the correction buffer 56a so as to erase the printed character by way of the erasure ribbon 31 (S220). In the example shown in FIG. 4A, the type "e" is hammered to erased the character "e". Then, the character code that corresponds to the character "e" is eliminated from the correction buffer 56a (S230).

When erasing of one character is finished, the processing returns to S210 where it is examined whether or not the code stored in the correction buffer 56a just ahead the erased character is a character code. If it is determined that the answer is "YES", The processings in S210 through S230 are repeated to erase the character string, in order of "m", "i", and "t", in the example shown in FIG. 4A.

Assuming that, after erasing the character at the start of the line, for instance "t" in the example shown, S210 determines that the code stored in the correction buffer 56a just ahead the location at which the carriage 10 positioned is not a character code. It is then examined whether or not this data is a line feed code (S240). If it is determined to be a line feed code, it is further examined whether or not the code just ahead the line feed code is a hyphen code which is a predetermined character code for connecting divided parts of a character string lying across two lines (S250). If this is a hyphen code, the word is considered as divided into two lines, so that the platen 21 is rotated to move the print paper one line back, while at the same time the carriage 10 is moved to the end of the line. After this movement, the erasure assembly 24b causes the print hammer 28 to hammer the type of hyphen by way of the erasure ribbon 31 so as to erase the hyphen (S260). The hyphen code stored in the correction buffer 56a is then eliminated (S270).

After the hyphen is erased, the processing again returuns to S210, and then it is examined whether or not the code stored in the correction buffer 56a just ahead the hyphen erased is a character code. If it is a character code, the processings is S210 through S230 are repeated to erase the character string printed while eliminating the code within the correction buffer 56a. For instance in FIG. 4A, the characters "y, r, e, v, e" are successively erased.

After erasing the characters, the processing returns to S210, it is further examined whether or not the code stored in the correction buffer 56a just ahead the location at which the carriage 10 is positioned is a character code. If it is determined to be neither a character code nor a line feed code (S240), the word is considered as completely erased, and the control routine is terminated. Otherwise, if it is determined that the code just ahead the location of the carriage 10 is a line feed code (S240) but not a hyphen code (S250), the word is considered as not being divided into two lines, so that erasing one word is considered as finished, terminating the control routine.

Figure 5:
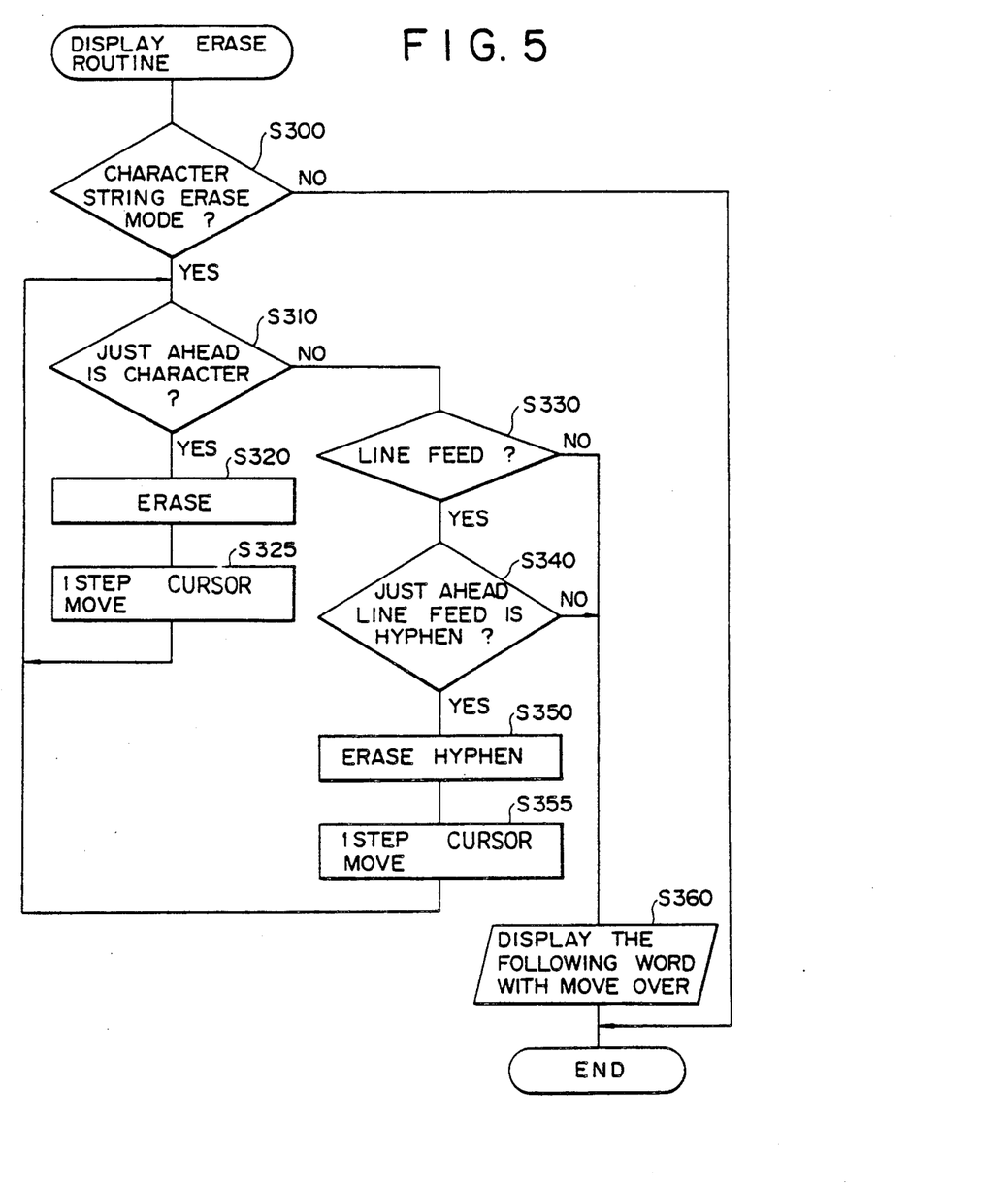
FIG. 5 is a flow chart showing another example of control routines.

The wordout processing for erasing at one time the word lying across two lines in the text mode, which is to be executed in the electronic control system 50 mentioned above, is not described with reference to the flow chart of FIG. 5.

In this case, the cursor is moved to the position just behind the word to be erased. If the word "every-time", for instance, is to be erased as shown in FIG. 4A, the cursor is moved to the space following the character "e" ("e" for "time"), and the wordout key 16 is then pressed. If the key input through the keyboard 3 is found to be the wordout key 16, the editing device, is determined to be in the character string erase mode (S300). It is then examined whether or not the data stored in the text memory 56b, which corresponds to the locational data just ahead the location where the cursor stops, is a character code (S210). If it is determined to be a character, the cursor is moved to the left by one digit, whereupon the character code stored in the text memory 56b is eliminated (S320), and the character "e" for "time" is erased from the display unit 5.

When erasing of one character is finished, the processing returns to S310 where it is examined whether or not the code stored in the the text memory 56b just ahead the erased character (i.e. "e" for "time") is a character code. If the answer is "YES", the processings in S310 and S320 are repeated to erase the character string, in order of "m", "i", and "t", in the example shown in FIG. 4A.

Assume that, after erasing the character at the start of the line, for instance "t" in the example shown, S310 determines whether the code stored in the text memory 56b just ahead the location at which the cursor positioned is a character code or not. It is then examined whether or not this data is a line feed code (S330). If it is determined to be a line feed code, it is further examined whether or not the code just ahead the line feed code is a hyphen code which is a predetermined character for connecting divided parts of a character string lying across two lines (S340). If this is a hyphen code, the word is considered as divided into two lines, so that the line feed code and the hyphen code are eliminated from the text memory 56b, while the hyphen is erased and the cursor is positioned at the end of the line located just above the line on the display unit 5.

After the hyphen is erased, the processing again returuns to S310, and then it is examined whether or not the code stored in the text memory 56b just ahead the hyphen erased is a character code. If it is a character code, the processings in S310 and S320 are repeated to erase the character string while eliminating the code within the text memory 56b. For instance in FIG. 4A, the characters "y, r, e, v, e" are successively erased.

After erasing the characters, the processing returns to S310, it is further examined whether or not the code stored in the text memory 56b just ahead the location at which the cursor is positioned is a character code. If it is determined to be neither a character code nor a line feed code (S340), the word is considered as completely erased, and the control routine is terminated, otherwise, if it is determined that the code just ahead the location of the carriage is a line feed code (S330) but not a hyphen code (S340), the word is considered as not being divided into two lines, so that the characters following the erased part are displayed with moving over the space having been occupied by the erased characters (S360). After the processing in S360 is finished, it is determined, in S300, that the device, is not in the character string erasure mode, and the control routine is terminated.

As described above, the text editing device according to the present embodiment is able to successively erase, in its character string erase mode (S200, S300), the character string printed on the print paper or the character string shown on the display unit (S210 through S230, S310 and S320), while also being capable of erasing a character string or a word lying across two lines with its divided parts connected by a hyphen with a single operation (S240 through S270, S330 through S350).

As a result, according to the text editing device of this embodiment, the word displayed across two lines can be erased at one time simply by pressing the wordout key 16.

Figure 4B:
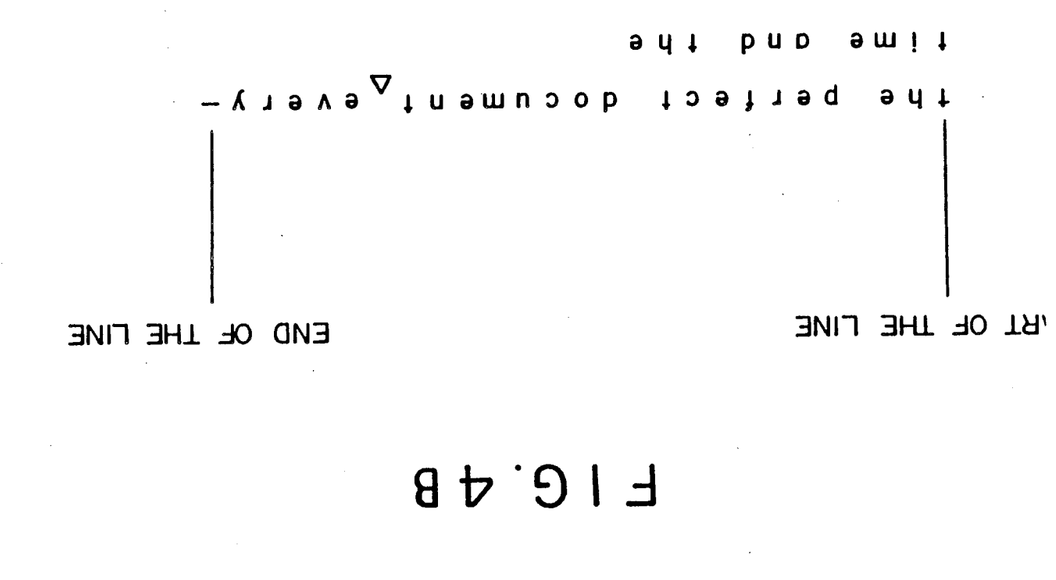

While in this embodiment, the word is erased backward, it is possible to erase it forward from top to end as shown in FIG. 4B. In this case, whether or not the data is a hyphen data is first examined, followed by the processing of determining it to be line feed data.

Figure 4C:
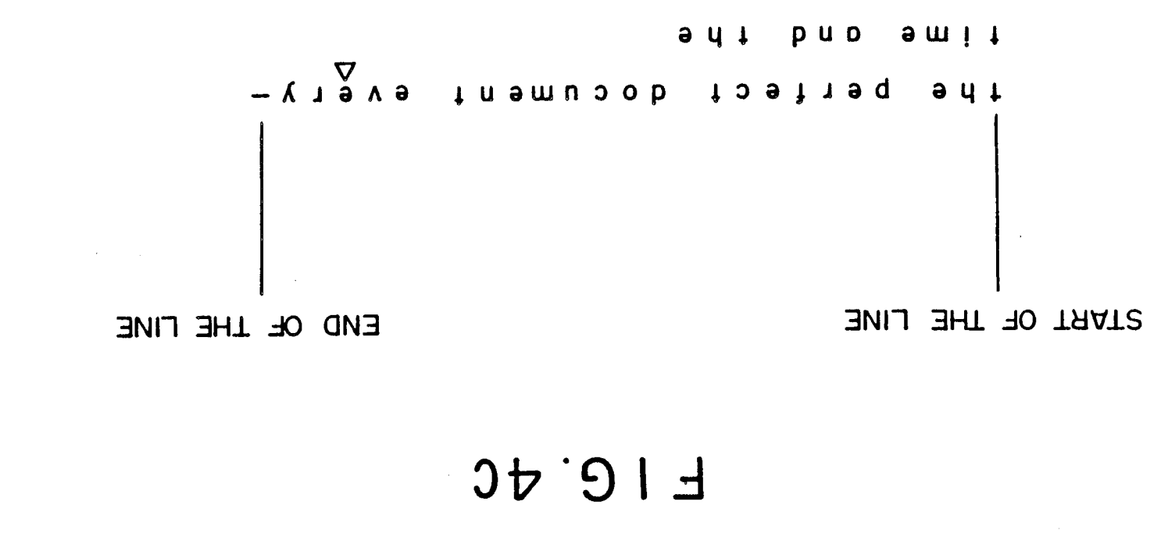
Figure 4D:
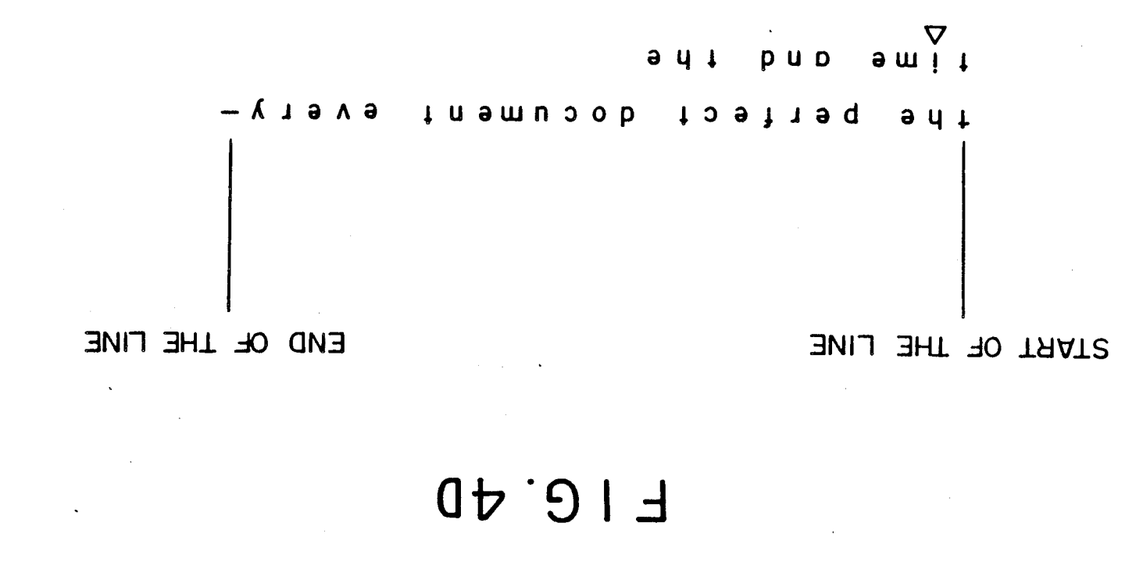

Furthermore, as shown in FIG. 4C and 4D, it is possible to designate a point in a character string.

While a preferred embodiment of the present invention has described above, the present invention is not limited to this embodiment but various other embodiments and modifications can be made without departing from the subject matter of the invention.

What is claimed is:

1. A text editing device for erasing with a single keystroke a word formed of a first character string at the end of a text line and a second character string on a following text line, said device comprising input means for inputting character codes and function codes, memory means for storing the codes, represent means for representing characters corresponding to the codes inputted by said input means, designate means for designating a point on a text line, said text line consisting of a plurality of character strings, said text editing device further comprising:
   erase means operable by said single only one word by eliminating keystroke for erasing characters of said second character string successively located behind the point designated by said designate means and for further erasing successive characters of said first character string located on a preceding line, in case that a predetermined character is located at the end of said preceding line and just behind the character erased by said erase means; and
   eliminate means operable by said same single keystroke for eliminating the character codes corresponding to the characters erased by said erase means and any line feed code stored with the character codes erased by said erase means.

2. The text editing device according to claim 1 wherein no character exists at the point designated by said designate means.

3. The text editing device according to claim 1 wherein said erase means further erases the character located on the point which is designed by said designate means and said eliminate means eliminates the code corresponding to said character.

4. The text editing device according to claim 3 wherein said erase means further erases the preceding character string located before the point designated by said designate means and said eliminate means eliminates the codes corresponding to said character string.

5. The text editing device according to claim 1 wherein said predetermined character is a hyphen.

6. The text editing device according to claim 1 wherein said designate means comprises a cursor and said represent means comprises a display.

7. The text editing device according to claim 1 wherein said designate means comprises a carriage and said represent means comprises a printing medium.

8. The text editing device according to claim 1 wherein said memory means stores at least the codes corresponding to the characters on the line on which the point designated by said designate means exists and a line located just below the line.

9. The text editing device according to claim 6 wherein said represent means represents characters following the erased characters by moving said following characters over the space having been occupied by the erased characters.

10. A text editing device comprising input means for inputting character codes and function codes, represent means for representing characters corresponding to the codes inputted by said input means, designate means for designating a point on a text line, said text line consisting of a plurality of character strings, a word being formed of a first character string at the end of a text line and a second character string on a following text line said text editing device further comprising:
   eliminate means operable by a single keystroke for eliminating only one word by eliminating characters of said first character string successively located behind the point designated by said designate means and for
   further eliminating successive characters of said second character string located on a successive line in case that a predetermined character is located at the end of said first character string and just in front of the characters eliminated by said eliminate means.

11. A text editing device comprising input code means for inputting character codes and function codes, represent means for representing characters corresponding to the codes inputted by said input means, designate means for designating a point on a text line, said text line consisting of a plurality of character strings, a word being formed of a first character string at the end of a text line and a second character string on a following text line said text editing device further comprising:
   eliminate means operable by a single keystroke for eliminating only one word by eliminating characters of said first character string successively located in front of the point designated by said designate means; and for further eliminating successive characters of said second character string located on a succeeding line in case that a predetermined character is located at the end of the preceding line.

12. The text editing device according to claim 11 where no character exists on the point designaged by said designate means.

13. The text editing device according to claim 11 wherein said erase means further erases the character located on the point which is designated by said designate means and said eliminate means eliminates the code corresponding to said character.

14. The text editing device according to claim 13 wherein said erase means further erases the successive character string located behind the point designated by said designate means and said eliminate means eliminates the codes corresponding to said character string.

15. The text editing device according to claim 11 wherein said predetermined character is a hyphen.

16. The text editing device according to claim 11 wherein said designate means comprises a cursor and said represent means comprises a display.

17. The text editing device according to claim 11 wherein said designate means comprises a carriage and said represent means comprises a printing medium.

18. The text editing device according to claim 11 wherein said memory means stores at least the codes corresponding to the characters on the line on which the point designated by said designate means exists and a line located just above the line.

19. The text editing device according to claim 16 wherein said represent means represents characters following the erased characters by moving said following characters over the space having been occupied by the erased characters.

* * * * *